(12) United States Patent
Joung et al.

(10) Patent No.: US 10,953,632 B2
(45) Date of Patent: Mar. 23, 2021

(54) ALUMINUM COMPOSITE PANEL CONTAINING AEROGEL AND METHOD FOR MANUFACTURING SAME

(71) Applicant: JIOS AEROGEL CORPORATION, Osan (KR)

(72) Inventors: Young Chul Joung, Gyeonggi-do (KR); Myung Je Roh, Seoul (KR); Jong Chul Park, Gyeonggi-do (KR); Min Woo Kim, Daejeon (KR); In Chang Cha, Gyeonggi-do (KR)

(73) Assignee: JIOS AEROGEL CORPORATION, Osan (KR)

( * ) Notice: Subject to any disclaimer, the term of this patent is extended or adjusted under 35 U.S.C. 154(b) by 37 days.

(21) Appl. No.: 15/417,087

(22) Filed: Jan. 26, 2017

(65) Prior Publication Data

US 2017/0190148 A1    Jul. 6, 2017

Related U.S. Application Data

(63) Continuation-in-part of application No. PCT/KR2014/008707, filed on Sep. 18, 2014.

(30) Foreign Application Priority Data

Jul. 30, 2014 (KR) .................. 10-2014-0097358

(51) Int. Cl.
*B32B 15/04* (2006.01)
*B32B 15/08* (2006.01)
(Continued)

(52) U.S. Cl.
CPC .............. *B32B 15/046* (2013.01); *B32B 5/18* (2013.01); *B32B 7/12* (2013.01); *B32B 15/08* (2013.01);
(Continued)

(58) Field of Classification Search
CPC .. E04C 2/292; B32B 5/18; B32B 7/12; B32B 15/20; B32B 37/18
See application file for complete search history.

(56) References Cited

U.S. PATENT DOCUMENTS

| 3,235,040 | A | * | 2/1966 | Ellis | ................. E04C 2/292 428/192 |
| 4,363,738 | A | | 12/1982 | Kummermehr | |

(Continued)

FOREIGN PATENT DOCUMENTS

| CN | 103862746 A | 6/2014 |
| EP | 1065004 A1 | 1/2001 |

(Continued)

OTHER PUBLICATIONS

Ding Wang, "Separation of Oil and Other Organics from Water Using Inverse Fluidization of Hydrophobic Aerogels", Arizona State University, pp. 114-119 (Year: 2011).*

(Continued)

*Primary Examiner* — Alex B Efta
(74) *Attorney, Agent, or Firm* — Morgan, Lewis & Bockius LLP

(57) ABSTRACT

An aluminum composite panel, containing an aerogel, includes an aerogel composite using a silica aerogel and a thermoplastic resin. A method for manufacturing the same includes providing an aluminum composite panel containing an aerogel, by molding an aerogel composite from a mixture of 1-90 wt % of a silica aerogel and 10-99 wt % of a thermoplastic resin, and then attaching aluminum plates on an upper surface and a lower surface of the aerogel composite, respectively, while an adhesive resin is coated on the upper surface and the lower surface. The aluminum composite panel containing an aerogel, manufactured according to the present invention, has a lower hygroscopic property than the conventional aluminum composite panel, due to the (Continued)

silica aerogel, and thus has an effect of exhibiting excellent adiabatic property and flame retardancy, retains excellent moldability, is light, and has an effect of facilitating a construction work.

4 Claims, 2 Drawing Sheets

(51) Int. Cl.
  B32B 15/085 (2006.01)
  B32B 15/082 (2006.01)
  B32B 15/20 (2006.01)
  B32B 37/12 (2006.01)
  B32B 37/18 (2006.01)
  F16L 59/06 (2006.01)
  B32B 5/18 (2006.01)
  B32B 7/12 (2006.01)
  E04B 1/80 (2006.01)

(52) U.S. Cl.
  CPC .......... B32B 15/082 (2013.01); B32B 15/085 (2013.01); B32B 15/20 (2013.01); B32B 37/12 (2013.01); B32B 37/18 (2013.01); F16L 59/06 (2013.01); B32B 37/1284 (2013.01); B32B 2250/02 (2013.01); B32B 2250/03 (2013.01); B32B 2250/40 (2013.01); B32B 2255/06 (2013.01); B32B 2255/102 (2013.01); B32B 2260/025 (2013.01); B32B 2264/102 (2013.01); B32B 2266/025 (2013.01); B32B 2266/0221 (2013.01); B32B 2266/057 (2016.11); B32B 2307/304 (2013.01); B32B 2307/3065 (2013.01); B32B 2307/73 (2013.01); B32B 2307/738 (2013.01); B32B 2311/24 (2013.01); B32B 2315/02 (2013.01); B32B 2323/04 (2013.01); B32B 2323/10 (2013.01); B32B 2329/04 (2013.01); B32B 2329/06 (2013.01); B32B 2607/00 (2013.01); E04B 1/80 (2013.01); Y02A 30/24 (2018.01); Y02B 80/10 (2013.01)

(56) References Cited

U.S. PATENT DOCUMENTS

| | | | |
|---|---|---|---|
| 5,124,101 A * | 6/1992 | Hirao | C04B 20/0076 252/62 |
| 5,948,314 A | 9/1999 | Gerhard et al. | |
| 7,468,205 B2 * | 12/2008 | Schwertfeger | B32B 27/18 428/323 |
| 2005/0100728 A1 * | 5/2005 | Ristic-Lehmann | A41D 19/01529 428/323 |
| 2006/0125158 A1 | 6/2006 | Rouanet et al. | |
| 2007/0007495 A1 | 1/2007 | Hayes | |
| 2009/0082479 A1 * | 3/2009 | Cho | C09D 127/16 521/141 |
| 2009/0148654 A1 | 6/2009 | Oronde et al. | |
| 2009/0183826 A1 | 7/2009 | Calvert | |
| 2013/0012623 A1 | 1/2013 | Harkabus et al. | |
| 2015/0209981 A1 | 7/2015 | Baek et al. | |
| 2017/0203552 A1 * | 7/2017 | D'Arcy | C08K 3/36 |

FOREIGN PATENT DOCUMENTS

| | | | | |
|---|---|---|---|---|
| EP | 1279885 A1 * | 1/2003 | ............ | F16L 59/141 |
| EP | 1787716 A1 | 5/2007 | | |
| EP | 2180114 A1 * | 4/2010 | ............... | E04C 2/08 |
| GB | 2187419 A | 9/1987 | | |
| JP | 11-128824 A | 5/1999 | | |
| KR | 1019870000453 B1 | 3/1987 | | |
| KR | 940005759 B1 | 6/1994 | | |
| KR | 10-0783012 B1 | 12/2007 | | |
| KR | 2012 0028635 A | 3/2012 | | |
| KR | 20120133856 A | 12/2012 | | |
| KR | 10-1255631 B1 | 4/2013 | | |
| WO | WO96/02695 A1 | 2/1996 | | |
| WO | WO96/03353 A1 | 8/1996 | | |
| WO | WO03/064025 A1 | 8/2003 | | |
| WO | WO03/097227 A1 | 11/2003 | | |
| WO | WO2005/047381 A1 | 5/2005 | | |
| WO | WO2006/002440 A2 | 1/2006 | | |
| WO | WO2012/044052 A2 | 4/2012 | | |
| WO | WO2014/025210 A1 | 2/2014 | | |

OTHER PUBLICATIONS

Armacell JIOS Aerogels Limited, Decision to Grant, EP13886647.0 dated May 8, 2017, 6 pgs.
Armacell JIOS Aerogels Limited, Certificate of Grant, EP13886-647.0 , dated May 30, 2018, 1 pg.
Joung, Office Action, U.S. Appl. No. 15/005,570, dated May 10, 2018, 18 pgs.
JIOS Aerogel Limited, Communication Pursuant to Rules 161(2) and 162, EP13886647.0, dated Feb. 12, 2016, 2 pgs.
JIOS Aerogel Limited Extended European Search Report, EP13886647.0, dated Mar. 28, 2017, 5 pgs.
JIOS Aerogel Limited, Communication Pursuant to Rules 70(2) and 70a(2), EP13886647.0, dated Apr. 18, 2017 1 pg.
JIOS Aerogel Limited, Communication Pursuant to Rules 161(2) and 162, EP13889597.4, dated Mar. 17, 2016, 2 pgs.
JIOS Aerogel Limited, Communication Pursuant to Rules 70a(2) and 70(2), EP13889597.4, dated Apr. 18, 2017, 1 pg.
Armacell JIOS Aerogels Limited Extended European Search Report, EP13889597.4, dated Mar. 29, 2017, 8 pgs.
JIOS Aerogel Corporation, Communication Pursuant to Rules 161(2) and 162, EP13890228.3, dated Mar. 2, 2016, 2 pgs.
Armacell JIOS Aerogel Corporation, Communication Pursuant to Rules 70(2) and 70a(2), EP13890228.3, dated May 31, 2017, 1 pg.
Armacell JIOS Aerogesl Limited, Partial Supplementary European Search Report, EP13890228.3, dated Feb. 8, 2017, 8 pgs.
JIOS Aerogel Corporation, Communication Pursuant to Rules 161(2) and 162, EP14898765.4, dated Mar. 9, 2017, 2 pgs.
JIOS Aerogel Corporation, Communication Pursuant to Rules 161(2) and 162, EP15882073.8, dated Oct. 5, 2017, 2 pgs.
JIOS International Search Report and Written Opinion, PCT/KR2013/006533, dated Feb. 27, 2014, 14 pgs.
JIOS International Search Report and Written Opinion, PCTKR2013006708, dated Apr. 24, 2014, 25 pgs.
JIOS International Search Report and Written Opinion, PCT/KR2013/006538, dated Apr. 30, 2014, 7 pgs.
JIOS International Preliminary Report on Patentability, PCT/KR2013/006538, dated Jan. 19, 2016, 5 pgs.
Joung, Office Action, U.S. Appl. No. 14/896,936, dated Aug. 12, 2016, 11 pgs.
Joung, Final Office Action, U.S. Appl. No. 14/896,936, dated Apr. 20, 2017, 10 pgs.
Joung, Notice of Allowance, U.S. Appl. No. 14/896,936, dated Oct. 4, 2017, 8 pgs.
Machine translation of JPH11-128824A, Hone, generated Nov. 21, 2016, 9 pgs.
Armacell JIOS Aerogels Limited, Communication Pursuant to Rule 114(2), EP13889597.4, dated May 8, 2017, 6 pgs.
JIOS Aerogel Corporation Extended European Search Report, EP14898765.4, dated Feb. 28, 2018, 8 pgs.
Joung, Final Office Action, US15/005,570, 10JAN2019, 14 pgs.
Anonymous: "S.3.6. Bulk Density and Tapped Density of Powders", Mar. 31, 2012, 1-6 pgs., XP055679407, Retrieved from the Internet: URL:http://www.who.int/medicines/publications/pharmacopoeia/Bulk-tapped-densityQAS11_450FINAL_MODIFIEDMarch2012.pdf [retrieved on Mar. 24, 2020].
Emre Mudam et al.: "Synthesis of SiO2 Aerogel via Ambient Pressure Drying Process Using Perlite Powder", 19th International Metallurgy & Materials Congress, Oct. 27, 2018 (Oct. 27, 2018), pp.

(56) References Cited

OTHER PUBLICATIONS 1-4, XP055679852, Retrieved from the Internet: URL: https://pdfs.semanticscholar.org/2fbe/3c0e7a4666bbf2cc18772d5f855a78f4e42b.pdf [retrieved on Mar. 25, 2020].
JIOS Aerogel Corporation, Communication Pursuant to Rules 94 (3) EP14898765.4, dated Mar. 31, 2020, 7 pgs.
Armacell Jios Aerogels Limited, Decision to Grant, EP13889597.4, dated Aug. 8, 2019, 2 pgs.

\* cited by examiner

[Fig. 1]
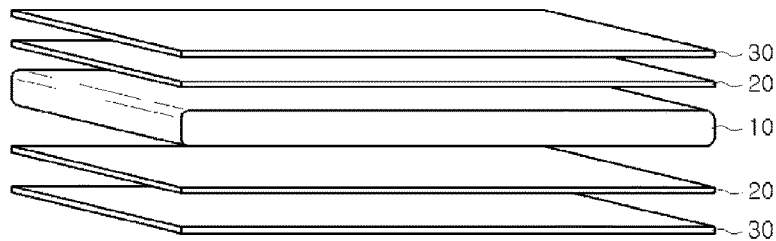
[Fig. 2]
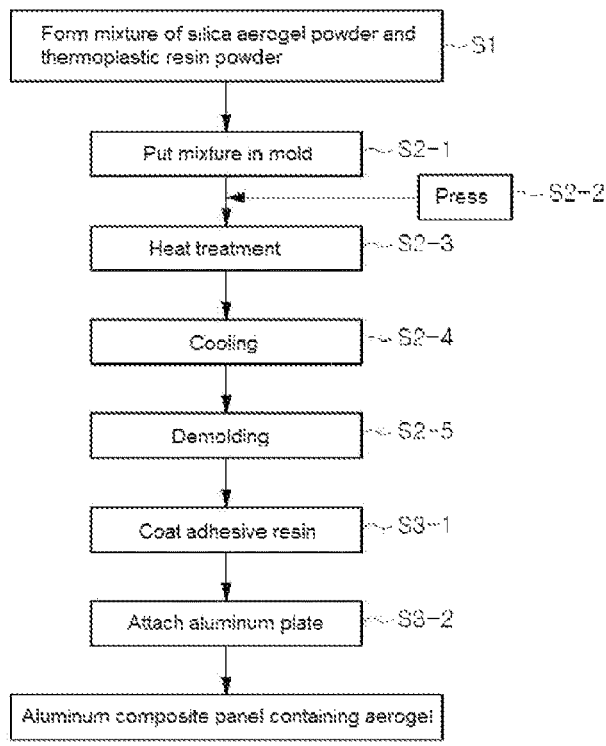
[Fig. 3]
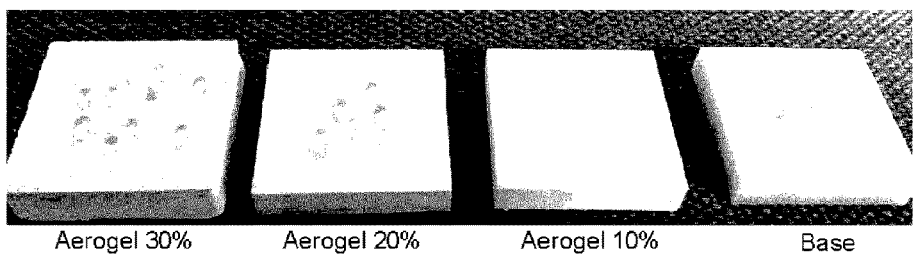
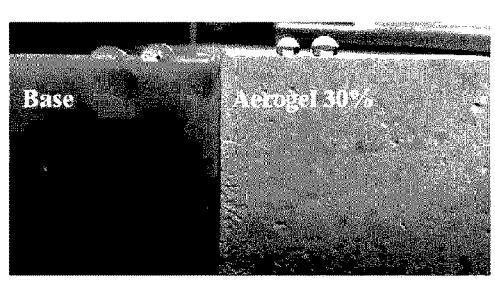

[Fig. 4]
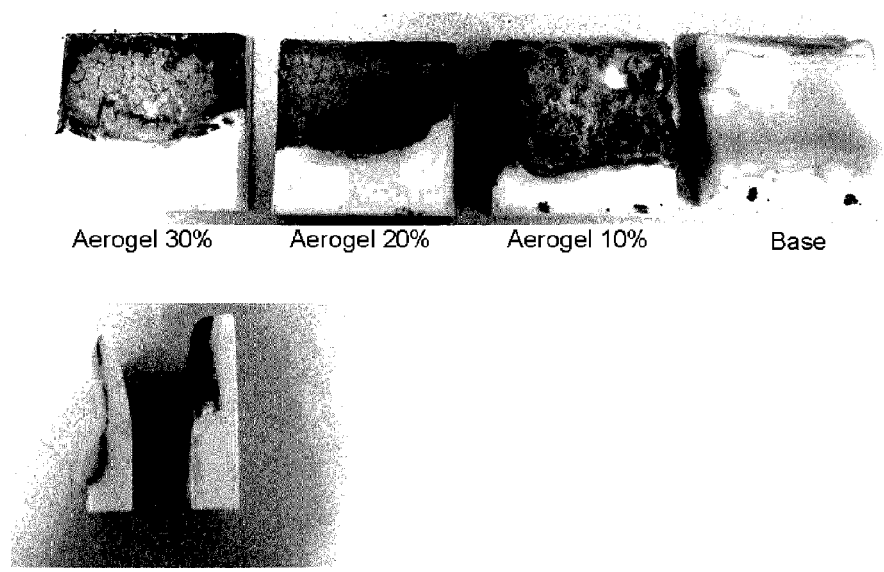

ALUMINUM COMPOSITE PANEL CONTAINING AEROGEL AND METHOD FOR MANUFACTURING SAME

RELATED APPLICATIONS

This application is a continuation-in-part of International Patent Application No. PCT/KR2014/008707, filed Sep. 18, 2014, which claims the priority to Korean Patent Application No. 10-2014-0097358, filed Jul. 30, 2014. Both of these applications are incorporated by reference herein in their entireties.

TECHNICAL FIELD

The present invention relates to an aluminum composite panel, and particularly, to an aluminum composite panel containing an aerogel, which includes an aerogel composite using a silica aerogel and a thermoplastic resin, thereby having improved adiabatic properties, flame retardant properties, and moldability, and a method for manufacturing the same.

BACKGROUND

An aluminum composite panel has a sandwich structure in which a synthetic resin such as a polymer non-toxic polyethylene resin or an inorganic material is applied between two aluminum plates having excellent corrosion resistance. The aluminum composite panel is lightweight, thereby avoiding damages to the inside and outside of a wall, is very firm and smooth, and has an excellent design factor as well as excellent functionalities. For example, the aluminum composite panel has an adiabatic property for protecting a building and a sound insulation property. Accordingly, the aluminum composite panel is ideally suited for application to the internal and external finishing, partitions, ceilings or entrances of a building.

Conventionally, a aluminum composite is manufactured by mixing and heating flame retardant powder and polyethylene pellets to prepare a mixed paste, and then performing extrusion molding. However, when the aluminum composite panel is manufactured in such a manner, it is difficult, if not impossible, to ensure flowability of the mixed paste during the extrusion molding. Moreover, in the case of fire, a flame retardant synthetic resin filled between aluminum plates flows downward due to heat, and during extrusion using an extruder, to ensure the flowability of the flame retardant synthetic resin, the flame retardancy powder may not be mixed at more than maximum 60 to 65 wt %. Consequently, the flame retardancy of the aluminum composite panel may not be enhanced any further.

In addition, a method for manufacturing an aluminum composite panel by applying a flame retarding material, for example, magnesium hydroxide, sodium hydroxide or aluminum hydroxide to a base has been also known. However, this method leads to high equipment and manufacturing costs during the fabrication process. Moreover, when a panel is molded in a curved or circular shape, the panel lacks flexibility, and thus presents further difficulties during the fabrication process.

Meanwhile, glass wool or rock wool used as a base in the conventional aluminum composite panel exhibits a decrease in an adiabatic property and an increase in a weight over time due to high hygroscopicity.

As described above, the conventional aluminum composite panel does not have adequate adiabatic properties, flame retardant properties, moldability, and the like.

SUMMARY

The present invention is developed to improve such problems, and is directed to providing an aluminum composite panel containing an aerogel, having improved adiabatic properties and flame retardant properties compared to the conventional aluminum composite panel. In addition, the aluminum panel of the present invention is capable of being molded in various forms using a mold. A method for manufacturing the same is also provided.

To achieve the object, the present invention provides an aluminum composite panel containing an aerogel, which includes an aerogel composite prepared with a mixture of 1 to 90 wt % of a silica aerogel and 10 to 99 wt % of a thermoplastic resin, an adhesive resin applied to each of the upper and lower surfaces of the aerogel composite, and aluminum plates attached to the adhesive resin (e.g., a first aluminum plate attached to the upper surface of the aerogel composite and a second aluminum plate attached to the lower surface of the aerogel composite).

Also, the present invention provides a method for manufacturing an aluminum composite panel containing an aerogel, which includes (a) preparing a mixture of 1 to 90 wt % of silica aerogel powder and 10 to 99 wt % of thermoplastic resin powder, (b) preparing an aerogel composite by putting the mixture prepared in step (a) in a mold and then heating and cooling the aerogel composite, and (c) attaching aluminum plates after an adhesive resin is applied to each of the upper and lower surfaces of the aerogel composite formed in step (b).

According to the manufacturing method, in step (a), the silica aerogel powder and the thermoplastic resin powder may be mixed at a speed of 10 to 30 rpm using a ribbon mixer.

According to the manufacturing method, the silica aerogel powder may have a uniform size of 100 μm or less, and also have a density of 0.05 to 0.1 g/cm$^3$.

According to the manufacturing method, the thermoplastic resin powder may have a uniform size of 100 μm or less, and also have a density of 0.1 g/cm$^3$ or less.

According to the manufacturing method, in step (b), the aerogel composite may be formed by compressing the mixture under a pressure of 250 to 500 psi.

According to the manufacturing method, in step (b), the aerogel composite may be formed by heating the mixture for 2 hours at 120 to 200° C.

According to the manufacturing method, in step (c), the adhesive resin may be applied to each of the upper and lower surfaces of the aerogel composite at a thickness of 0.1 mm.

An aluminum composite panel containing an aerogel prepared according to the present invention as described above has lower hygroscopicity than the conventional aluminum composite panel due to a silica aerogel, and thus exhibits improved adiabatic properties and improved flame-retardant properties. Also, the aluminum composite panel of the present invention contains a suitable amount of thermoplastic resin improving fabrication of the aluminum composite panel (e.g., increased flow thereby improving molding processes). In addition, the thermoplastic resin decreases an overall weight of the aluminum composite panel relative to the panels of the conventional prior art.

BRIEF DESCRIPTION OF THE DRAWINGS

FIG. 1 is an exploded perspective view of a structure of an aluminum composite panel containing an aerogel according to the present invention.

FIG. 2 is a process flowchart illustrating a method for manufacturing an aluminum composite panel containing an aerogel according to the present invention.

FIG. 3 is an image obtained by a hygroscopicity test of the aerogel composite constituting the present invention.

FIG. 4 is an image obtained by a fire resistance test of the aerogel composite constituting the present invention.

EXPLANATION OF SYMBOLS

10: Aerogel composite;
20: Adhesive resin; and
30: Aluminum plate.

DETAILED DESCRIPTION

Hereinafter, exemplary embodiments of the present invention will be described in detail with reference to the accompanying drawings. However, the following embodiments are provided so that those of ordinary skill in the art can fully understand the present invention and thus may be modified into various forms, and the scope of the present invention is not limited to the examples that will be described below.

FIG. 1 is an exploded perspective view of a structure of an aluminum composite panel containing an aerogel according to the present invention.

As shown in FIG. 1, the aluminum composite panel containing an aerogel according to the present invention is composed of an aerogel composite 10, an adhesive resin 20 applied to each of the upper and lower surfaces of the aerogel composite 10, and aluminum plates 30 attached to the adhesive resin 20 (e.g., a first aluminum plate attached to the upper surface of the aerogel composite 10 and a second aluminum plate attached to the lower surface of the aerogel composite 10).

Here, the aerogel composite 10 is composed of a mixture of 1 to 90 wt % of a silica aerogel and 10 to 99 wt % of a thermoplastic resin. The silica aerogel is flame retardant and results in an adiabatic effect due to its structure in which nano-scale pores are formed. When the silica aerogel is contained at less than 1 wt %, the adiabatic effect and the flame-retardant properties of the panel may not be expected. In addition, when the silica aerogel is contained at more than 90 wt %, proportionally, a content of the thermoplastic resin is reduced, and thus extrusion moldability is degraded. Therefore, the contents of silica aerogel and the thermoplastic resin are preferably mixed in the above ranges.

The thermoplastic resin used in the present invention may be any one or a mixture of at least two of ethylene vinyl acetate (EVA), polyethylene (PE), polypropylene (PP), and polyvinyl butyral (PVB). These thermoplastic resins impart extrusion moldability when the aerogel composite 10 is molded in the mixture with the silica aerogel. However, when the content of the thermoplastic resin is less than 10 wt %, the extrusion moldability is insufficient. Moreover, when the content of the thermoplastic resin is more than 99 wt %, due to lack of the silica aerogel, it is difficult to obtain the adiabatic effect and the flame-retardant properties of the panel. Therefore, the thermoplastic resin should be mixed in the range of 10 to 99 wt %.

In the preparation of the aerogel composite 10, the silica aerogel and the thermoplastic resin are preferably mixed in the form of powder for a uniform mixture. Here, for a uniform mixture, the silica aerogel powder most preferably has a uniform size of 100 μm or less and a density of 0.05 to 0.1 g/cm$^3$, and the thermoplastic resin powder also most preferably has a uniform size of 100 μm or less and a density of 0.1 g/cm$^3$ or less.

A method for manufacturing an aluminum composite panel containing an aerogel according to the present invention, constituted as described above, comprises the following steps.

That is, FIG. 2 is a process flowchart illustrating a method for manufacturing an aluminum composite panel containing an aerogel according to the present invention, and the process sequence is as follows.

In the first step of the present invention, step (a), a silica aerogel and a thermoplastic resin are prepared in the form of powder, and 1 to 90 wt % of the silica aerogel powder and 10 to 99 wt % of the thermoplastic resin powder are mixed to form a mixture (S1). Here, the thermoplastic resin may be any one or a mixture of at least two of ethylene vinyl acetate (EVA), polyethylene (PE), polypropylene (PP) and polyvinyl butyral (PVB). In addition, for a uniform mixture, the silica aerogel powder most preferably has a uniform size of 100 μm or less and a density of 0.05 to 0.1 g/cm$^3$, and the thermoplastic resin powder also most preferably has a uniform size of 100 μm or less and a density of 0.1 g/cm$^3$ or less. The silica aerogel powder is preferably mixed with the thermoplastic resin powder at a speed of 10 to 30 rpm using a ribbon mixer. The ribbon mixer, which is also referred to as a screw mixer, may serve to uniformly mix powders with a plurality of ribbon-like (or screw-like) wings. Mixing performance at speeds of less than 10 rpm is decreased. Moreover, speeds of more than 30 rpm cause the silica aerogel to be scattered. Therefore, the mixer needs to be operated at a speed in the range of 10 to 30 rpm.

Subsequently, in the second step, step (b), an aerogel composite is prepared by putting the mixture of the silica aerogel and the thermoplastic resin in a mold (S2-1) for manufacture in a panel form. Thereafter, the second step further includes heating (S2-3), cooling (S2-4) and demolding (S2-5) the resulting mixture. Particularly, heating may be performed for 2 hours at 120 to 200° C., and due to the heating under the temperature and time conditions, the mixture of the silica aerogel and the thermoplastic resin has flowability in a semi-melted or melted state, and thus is easily molded in a mold. Meanwhile, in the preparation of the aerogel composite, the mixture of the silica aerogel and the thermoplastic resin may be compressed under a pressure of 250 to 500 psi before heating and after being put in the mold (S2-2). During the compression, the mixture of the silica aerogel and the thermoplastic resin is easily molded in the mold. However, under a pressure of less than 250 psi or more than 500 psi, molding is disrupted. Therefore the compression is preferably performed under a pressure of 250 to 500 psi.

Afterward, in the third step, step (c), an adhesive resin is applied to each of the upper and lower surfaces of the aerogel composite prepared in step (b) (S3-1), and then the aluminum plates are attached to the applied adhesive resin (S3-2). Particularly, when the adhesive resin is applied to each of the upper and lower surfaces of the aerogel composite, it is preferably applied at a thickness of 0.1 mm.

As the aluminum plates are applied to the adhesive resin as described above, a desired aluminum composite panel containing an aerogel of the present invention is completed.

Meanwhile, FIG. 3 is an image obtained by a hygroscopicity test of the aerogel composite constituting the present invention, and FIG. 4 is an image obtained by a fire resistance test of the aerogel composite constituting the present invention.

First, as shown in FIG. 3, it can be seen that a contact angle is proportional to an increased content of the silica aerogel from less than 10 wt %, to 10 wt %, to 20 wt %, and to 30 wt %. Therefore, as the aerogel composite of the present invention contains up to 90% of the silica aerogel, it can be seen that it has low hygroscopicity, thereby resulting in improved adiabatic properties.

Moreover, as shown in FIG. 4, as the content of the silica aerogel is increased from less than 10 wt %, to 10 wt %, to 20 wt %, and to 30 wt %, it can be seen that the original shape is maintained to the greatest extent possible and the sample is not melted due to high temperatures.

Therefore, the aluminum composite panel containing an aerogel, manufactured according to the present invention, has improved adiabatic properties and flame-retardant properties compared to the conventional aluminum composite panel. Also, since the aluminum composite panel containing an aerogel contains a suitable amount of the thermoplastic resin together with the silica aerogel, it can be molded in various forms using a mold.

While the present invention has been described with reference to the exemplary embodiments, it is not limited to the embodiments, and various modifications is possibly made by those of ordinary skill in the art within the scope of the technical idea of the present invention.

What is claimed is:

1. A method for manufacturing an aluminum composite panel containing an aerogel, comprising:
   (a) preparing a mixture of 10 to 90 wt % of silica aerogel powder having a uniform size of 100 μm or less and a density of 0.05 to 0.1 g/cm$^3$ and 10 to 90 wt % of thermoplastic resin powder having a uniform size of 100 μm or less and a density of 0.1 g/cm$^3$ or less;
   (b) preparing an aerogel composite by putting the mixture prepared in step (a) in a mold and heating and cooling the resulting mixture, wherein, in step (b), the aerogel composite is compressed under a pressure of 250 to 500 psi and heated for 2 hours at 120 to 200° C.; and
   (c) attaching an aluminum plate in a state in which an adhesive resin has been applied to each of upper and lower surfaces of the aerogel composite prepared in step (b) so that the aerogel composite containing 10 to 90 wt % of silica aerogel powder extends from the upper surface of the aerogel composite on which the adhesive resin has been applied to the lower surface of the aerogel composition on which the adhesive resin has been applied.

2. The method of claim 1, wherein, in step (a), the silica aerogel powder and the thermoplastic resin powder are mixed at a speed of 10 to 30 rpm using a ribbon mixer.

3. The method of claim 1, wherein, in step (c), the adhesive resin is applied at a thickness of 0.1 mm to each of the upper and lower surfaces of the aerogel composite.

4. The method of claim 1, wherein the aerogel composite is prepared by extrusion molding.

* * * * *